(12) United States Patent
Lunt et al.

(10) Patent No.: US 8,874,556 B2
(45) Date of Patent: *Oct. 28, 2014

(54) RANKING SEARCH RESULTS BASED ON THE FREQUENCY OF ACCESS ON THE SEARCH RESULTS BY USERS OF A SOCIAL-NETWORKING SYSTEM

(75) Inventors: Christopher Lunt, Mountain View, CA (US); Nicholas Galbreath, San Francisco, CA (US); Jeffrey Winner, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,903

(22) Filed: Dec. 22, 2010

(65) Prior Publication Data
US 2011/0093460 A1    Apr. 21, 2011

Related U.S. Application Data

(63) Continuation of application No. 12/750,330, filed on Mar. 30, 2010, now Pat. No. 7,890,501, which is a continuation of application No. 10/967,609, filed on Oct. 18, 2004, now Pat. No. 7,788,260, which is a continuation-in-part of application No. 10/867,610, filed on Jun. 14, 2004, now Pat. No. 7,478,078.

(51) Int. Cl.
| | |
|---|---|
| *G06F 7/00* | (2006.01) |
| *H04L 29/06* | (2006.01) |
| *G06Q 30/02* | (2012.01) |
| *G06F 17/22* | (2006.01) |
| *G06F 17/30* | (2006.01) |

(52) U.S. Cl.
CPC ........ *G06Q 30/0275* (2013.01); *G06F 17/2247* (2013.01); *H04L 63/102* (2013.01); *G06F 17/3089* (2013.01); *G06F 17/30864* (2013.01)

USPC .......... 707/723; 707/722; 707/732; 707/727; 707/784; 707/781

(58) Field of Classification Search
USPC ......................... 707/722, 723, 727, 781, 784
See application file for complete search history.

(56) References Cited

U.S. PATENT DOCUMENTS

| | | |
|---|---|---|
| 5,796,393 A | 8/1998 | MacNaughton |
| 5,950,200 A | 9/1999 | Sudai |

(Continued)

OTHER PUBLICATIONS

Pujol, Josep M., Ramon Sangüesa, and Jordi Delgado. "Extracting reputation in multi agent systems by means of social network topology." Proceedings of the first international joint conference on Autonomous agents and multiagent systems: part 1. ACM, 2002, pp. 467-474.*

(Continued)

*Primary Examiner* — Cheyne D Ly
(74) *Attorney, Agent, or Firm* — Baker Botts L.L.P.

(57) ABSTRACT

Particular embodiments access a search query submitted by a first user of a social-networking system; identify one or more web pages in response to the search query; retrieve, from the social-networking system, social-networking information of the first user to identify one or more second users of the social-networking system who are connected to the first user within a predetermined degree of separation within the social-networking system; for each of the one or more web pages, determine a value indicating a number of times that the web page has been accessed by the one or more second users; rank the one or more web pages based on the value determined for each web page; and send a ranked set of hyperlinks for the one or more web pages to a second computing device associated with the first user.

18 Claims, 10 Drawing Sheets

(56) References Cited

U.S. PATENT DOCUMENTS

| | | | |
|---|---|---|---|
| 5,963,951 A | 10/1999 | Collins | |
| 5,978,768 A | 11/1999 | McGovern | |
| 6,038,561 A | 3/2000 | Snyder | |
| 6,052,122 A | 4/2000 | Sutcliffe | |
| 6,061,681 A | 5/2000 | Collins | |
| 6,073,105 A | 6/2000 | Sutcliffe | |
| 6,073,138 A | 6/2000 | de l'Etraz | |
| 6,175,831 B1 | 1/2001 | Weinreich | |
| 6,185,558 B1 | 2/2001 | Bowman | |
| 6,249,282 B1 | 6/2001 | Sutcliffe | |
| 6,269,369 B1 | 7/2001 | Robertson | |
| 6,324,541 B1 | 11/2001 | de l'Etraz | |
| 6,363,427 B1 | 3/2002 | Teibel | |
| 6,366,962 B1 | 4/2002 | Teibel | |
| 6,370,510 B1 | 4/2002 | McGovern | |
| 6,408,309 B1 | 6/2002 | Agarwal | |
| 6,438,579 B1 | 8/2002 | Hosken | |
| 6,539,232 B2 * | 3/2003 | Hendrey et al. | 455/456.1 |
| 6,542,748 B2 | 4/2003 | Hendrey | |
| 6,640,218 B1 | 10/2003 | Golding | |
| 6,735,568 B1 | 5/2004 | Buckwalter | |
| 7,069,308 B2 | 6/2006 | Abrams | |
| 7,110,993 B2 | 9/2006 | Soulanille | |
| 7,152,061 B2 | 12/2006 | Curtis | |
| 7,472,110 B2 | 12/2008 | Achlioptas | |
| 7,478,078 B2 | 1/2009 | Lunt | |
| 7,788,260 B2 | 8/2010 | Lunt | |
| 7,856,449 B1 | 12/2010 | Martino | |
| 8,010,458 B2 | 8/2011 | Galbreath | |
| 2002/0004784 A1 | 1/2002 | Forbes | |
| 2002/0059201 A1 | 5/2002 | Work | |
| 2002/0066016 A1 | 5/2002 | Riordan | |
| 2002/0086676 A1 | 7/2002 | Hendrey | |
| 2002/0086732 A1 | 7/2002 | Kirmse | |
| 2002/0099947 A1 | 7/2002 | Evans | |
| 2002/0183117 A1 | 12/2002 | Takahashi | |
| 2002/0196273 A1 * | 12/2002 | Krause | 345/738 |
| 2003/0018978 A1 * | 1/2003 | Singal et al. | 725/115 |
| 2003/0154194 A1 | 8/2003 | Jonas | |
| 2003/0208474 A1 * | 11/2003 | Soulanille et al. | 707/3 |
| 2004/0034601 A1 | 2/2004 | Kreuzer | |
| 2004/0128322 A1 | 7/2004 | Nagy | |
| 2004/0144301 A1 | 7/2004 | Neudeck | |
| 2004/0148275 A1 * | 7/2004 | Achlioptas | 707/3 |
| 2004/0215648 A1 | 10/2004 | Marshall | |
| 2004/0215793 A1 * | 10/2004 | Ryan et al. | 709/229 |
| 2004/0255237 A1 * | 12/2004 | Tong | 715/501.1 |
| 2005/0010551 A1 | 1/2005 | McGeachie | |
| 2005/0015432 A1 * | 1/2005 | Cohen | 709/201 |
| 2005/0021750 A1 | 1/2005 | Abrams | |
| 2005/0091202 A1 * | 4/2005 | Thomas | 707/3 |
| 2005/0120084 A1 | 6/2005 | Hu | |
| 2005/0125376 A1 | 6/2005 | Curtis | |
| 2005/0125408 A1 * | 6/2005 | Somaroo et al. | 707/10 |
| 2005/0171955 A1 * | 8/2005 | Hull et al. | 707/10 |
| 2005/0198031 A1 | 9/2005 | Pezaris | |
| 2005/0216454 A1 | 9/2005 | Diab | |
| 2005/0222987 A1 | 10/2005 | Vadon | |
| 2005/0267766 A1 | 12/2005 | Galbreath | |
| 2005/0267940 A1 | 12/2005 | Galbreath | |
| 2005/0273378 A1 | 12/2005 | MacDonald-Korth | |
| 2006/0136419 A1 | 6/2006 | Brydon | |
| 2011/0087658 A1 | 4/2011 | Lunt | |
| 2011/0093346 A1 | 4/2011 | Lunt | |
| 2011/0093498 A1 | 4/2011 | Lunt | |
| 2011/0093506 A1 | 4/2011 | Lunt | |
| 2011/0093709 A1 | 4/2011 | Lunt | |

OTHER PUBLICATIONS

Watts et al., Science, vol. 296, May 2002, pp. 1302-1305.*
U.S. Appl. No. 12/982,683, filed Dec. 30, 2010, Lunt.
Office Action for U.S. Appl. No. 12/975,884, May 24, 2011.
Office Action for U.S. Appl. No. 12/975,884, Dec. 30, 2011.
Office Action for U.S. Appl. No. 12/975,779, Apr. 25, 2011.
Office Action for U.S. Appl. No. 12/975,779, Dec. 30, 2011.
Office Action for U.S. Appl. No. 12/975,850, May 25, 2011.
Office Action for U.S. Appl. No. 12/975,850, Jan. 10, 2012.
Office Action for U.S. Appl. No. 12/975,797, Apr. 26, 2011.
Office Action for U.S. Appl. No. 12/975,797, Dec. 29, 2011.
Office Action for U.S. Appl. No. 12/980,221, Jun. 17, 2011.
Office Action for U.S. Appl. No. 12/980,221, Dec. 30, 2011.
Office Action for U.S. Appl. No. 12/982,683, Jun. 20, 2011.
Office Action for U.S. Appl. No. 12/982,683, Feb. 16, 2012.
U.S. Appl. No. 13/603,228, filed Sep. 4, 2012, Lunt.
Bedell, Doug, "Meeting your new best friends Six Degrees widens your contacts in exchange for sampling Web sites", The Dallas Morning News, Oct. 27, 1998.
Definition of Hash Value, The Authoritative Dictionary of IEEE Standards Terms, Seventh Edition, 2000, Standards Information Network IEEE Press.
http://en.wikipedia.org/wiki/MD5, Downloaded Jun. 21, 2013.
http://en.wikipedia.org/wiki/SHA-1, Downloaded Jun. 21, 2013.

* cited by examiner

FIG. 3

Adjacency List

| |
|---|
| ME: A, B, C |
| A: ME, F, G |
| B: ME, H |
| C: ME, D, E |
| D: C, I, J |
| E: C, K |
| F: A, L |
| G: A, H |
| H: B, G |
| I: D, N |
| J: D |
| K: E |
| L: F, M |
| M: L |
| N: I, O |
| O: N |
| P: Q, R |
| Q: P, R |
| R: P, Q |
| S: |
| T: U |
| U: T |

RANKING SEARCH RESULTS BASED ON THE FREQUENCY OF ACCESS ON THE SEARCH RESULTS BY USERS OF A SOCIAL-NETWORKING SYSTEM

CROSS-REFERENCE TO RELATED APPLICATIONS

This application is a continuation of U.S. patent application Ser. No. 12/750,330, filed Mar. 30, 2010, which is a continuation of U.S. patent application Ser. No. 10/967,609, filed Oct. 18, 2004, which is a continuation-in-part of U.S. patent application No. 10/867,610, filed Jun. 14, 2004, now U.S. Pat. No. 7,478,078, issued Jan. 13, 2009.

BACKGROUND OF THE INVENTION

1. Field of the Invention

The present invention generally relates to data processing, and more particularly, to a method and system for generating and presenting search results that are based on social network information.

2. Description of the Related Art

Search engines have become popular tools to identify and locate specific information on the Internet. A search engine is a computer program that, when queried for information, retrieves either related information or pointers to the location of related information, or both, by evaluating content stored in its search database.

A key metric in evaluating the performance of search engines is relevance of the search results. Search engine developers are always striving to deliver search results that are relevant to the search query being processed. Consistent with this goal, there have been attempts to rank search results based on a number of different factors. One of the more popular ways to rank search results involves analyzing the location and frequency of keywords on a web page. Another frequently used technique is analyzing how web pages link to each other. A web page gets a ranking boost based on the number of other web pages that are linked to it. Click-through rates of search results are analyzed in some search engines. The general rule is: the higher the click-through rate, the higher the ranking

SUMMARY OF THE INVENTION

The invention provides still another technique to improve the relevance of search results. According to an embodiment of the invention, search results, including sponsored links and algorithmic search results, are generated in response to a query, and are ranked based on the frequency of clicks on the search results by members of social network who are within a predetermined degree of separation from the member who submitted the query. The predetermined degree of separation is equal to one if the click activities of only the friends of the member who submitted the query are to be examined.

A search result may also be marked based on its click history. In one embodiment, a search result is marked with an image or a text string if there was a single click on the search result by a friend of the member who submitted the query. In other embodiments, the frequency of clicks by members of social network who are within a predetermined degree of separation from the member who submitted the query is examined. If such frequency exceeds a minimum value, the associated search result is marked with an image or a text string.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a sample adjacency list that is maintained by the graphs servers of the present invention.

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
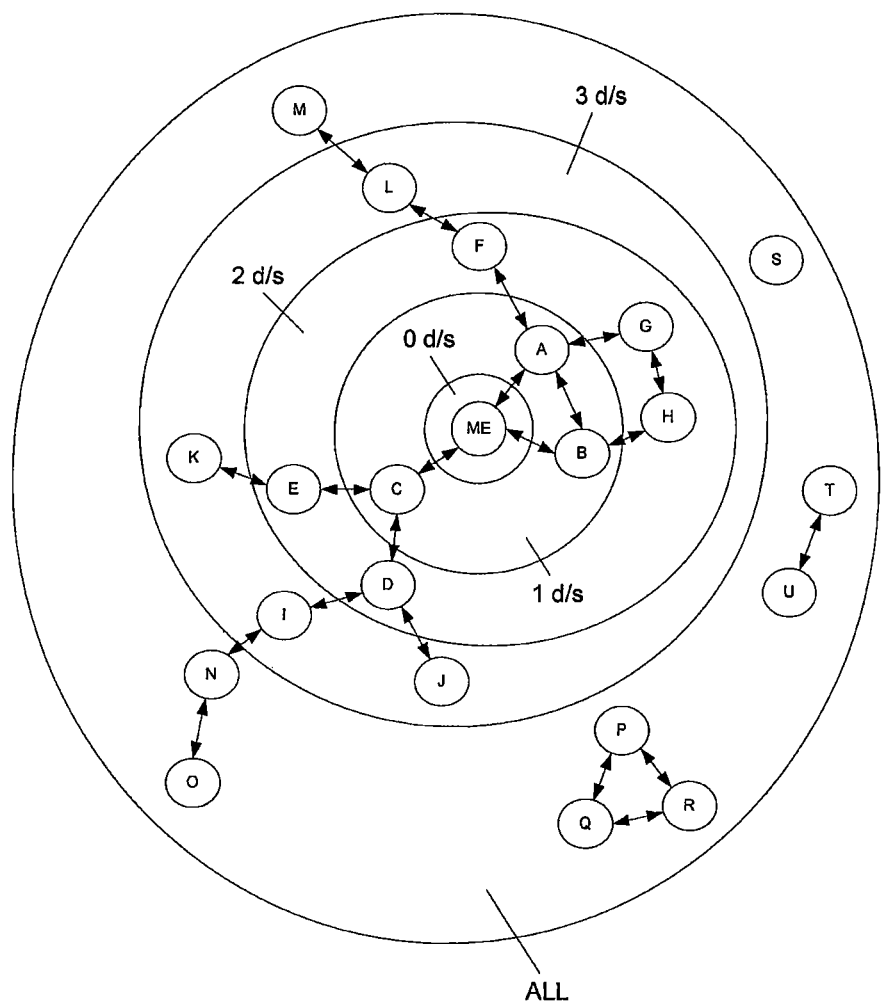
FIG. 1 is a diagram illustrating the relationships between members in a social network.

FIG. 1 illustrates a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category All.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
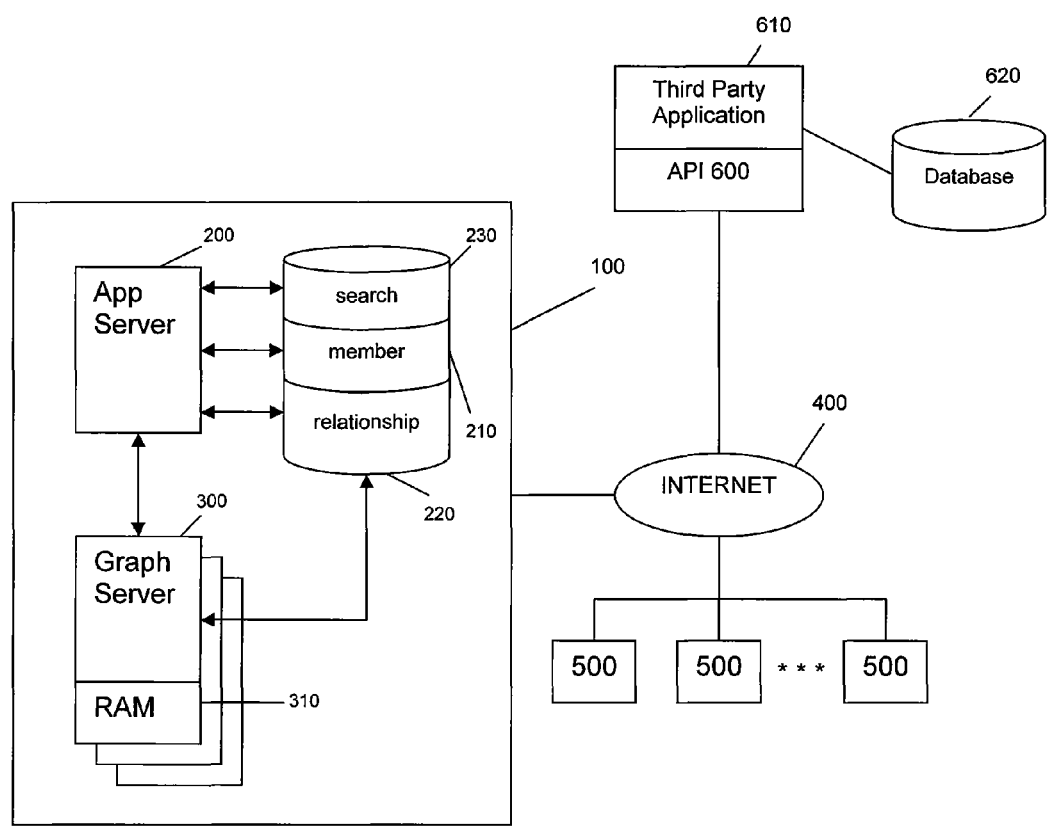
FIG. 2 is a block diagram illustrating a system for providing relationship information from a social network to an existing database, according to one embodiment of the present invention.

FIG. 2 is a block diagram illustrating a system for creating and managing an online social network. As shown, FIG. 2 illustrates a system 100, including an application server 200 and graph servers 300. The computers of system 100 are connected by a network 400, e.g., the Internet, and accessible by over the network by a plurality of computers, collectively designated as 500. The application server 200 manages a member database 210, a relationship database 220, and a search database 230.

The member database 210 contains profile information for each of the members in the online social network managed by the system 100. The profile information may include, among other things: a unique member identifier, name, age, gender, location, hometown, references to image files, listing of interests, attributes, and the like. The profile information also includes VISIBILITY and CONTACTABILITY settings, the uses of which are described in a commonly owned, co-pending application, "System and Method for Managing Information Flow Between Members of an Online Social Network," U.S. patent application Ser. No. 10/854,057, filed May 26, 2004, the contents of which are hereby incorporated by reference. The relationship database 220 stores information defining to the first degree relationships between members. The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The application server 200 also manages the information exchange requests that it receives from the remote computers 500. The graph servers 300 receive a query from the application server 200, process the query and return the query results to the application server 200. The graph servers 300 manage a representation of the social network for all the members in the member database. The graph servers 300 have a dedicated memory device 310, such as a random access memory (RAM), in which an adjacency list that indicates all first degree relationships in the social network is stored.

A sample adjacency list that reflects the social network map of FIG. 1 is shown in FIG. 3. A list item is generated for each member and contains a member identifier for that member and member identifier(s) corresponding to friend(s) of that member. As an alternative to the adjacency list, an adjacency matrix or any other graph data structure may be used. The graph servers 300 and related components are described in detail in a commonly owned, co-pending application, "System and Method for Managing an Online Social Network," U.S. patent application Ser. No. 10/854,054, filed May 26, 2004, the contents of which are hereby incorporated by reference.

The graph servers 300 respond to requests from application server 200 to identify relationships and the degree of separation between members of the online social network. The application server 200 is further configured to process requests from a third party application 610 to provide social network information (e.g., the relationships between individuals) for user records maintained in a third party database 620. The third-party application 610 makes the requests to the application server 200 through an application programming interface (API) 600.

The API 600 provides application developers with a set of methods, method signatures, data structures, and the like that expose an interface used by the third party application 610 to communicate with the application server 200. Application developers use the methods defined by the API 600 to construct applications that can communicate with the application server 200. There are many programmatic and syntactical choices to define the API methods that will effectively encapsulate the data and operations that are used in the invention. Thus, specific API methods, routines and data structures described below are illustrative in nature and are neither limiting nor definitive of the API 600.

Figure 4:
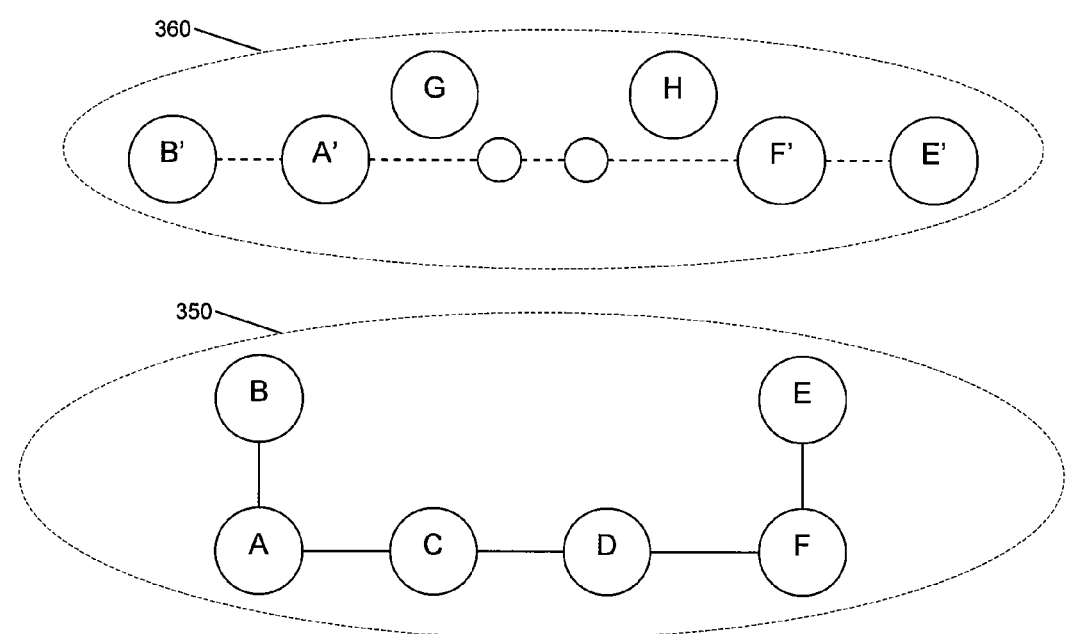
FIG. 4 is a block diagram illustrating the relationships between members in a social network and the relationships between users in an existing database.

FIG. 4 illustrates an example of a subset of a social network graph 350 maintained by the graph servers 300 along with a subset of database records 360 maintained in the third party database 620. As depicted, the subset 350 includes members A, B, C, D, E and F, and the subset 360 include records for A', B', E', F', G and H. A and A' represent the same individual but are labeled differently to signify that a database record for this person exists in both the member database 210 and the third party database 620. The same is true for: B and B', E and E', and F and F'. By contrast, database records for individuals C, D exist in the member database 210, but not in the third party database 620, and database records for individuals G, H exist in the third party database 620, but not in the member database 210.

The relationships between individuals A, B, C, D, E and F are maintained in the relationship database 220 and the graph servers 300. The flow diagram shown in FIG. 5 is used to find out the relationships between individuals A', B', E', F', G and H, namely to obtain the social network information used to construct the edges (shown as dashed lines in FIG. 4) between (A', B'), (E', F') and (A', F').

Figure 5:
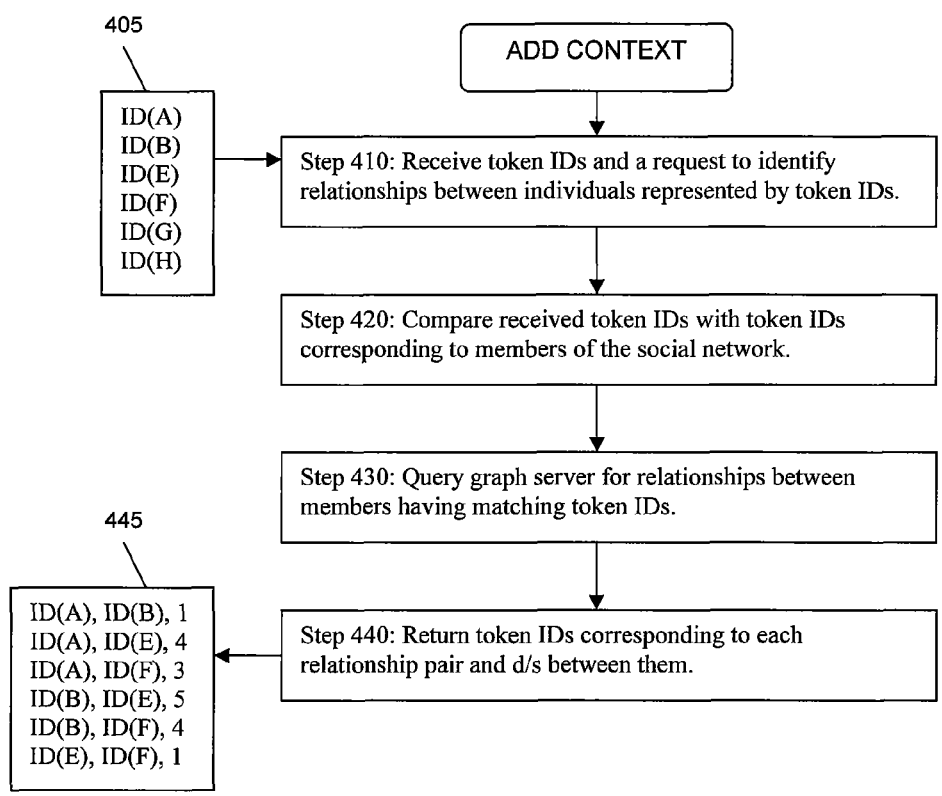
FIG. 5 is a flow diagram illustrating a method for providing relationship information to an existing database.

FIG. 5 is a flow diagram that illustrates a method for processing a request for social network information by the third party application 610 in the system of FIG. 2. In Step 410, the application server 200 receives a request from the third party application 610 to identify social network relationships (i.e., the edges between nodes) among users who are represented by a set of ID tokens 405. For example, API 600 may provide a method to make such a request according to the following:

relationship_pairs[ ] find_Connections(ID_Tokens[ ], credential_Type, hash_Type).

The find_Connections method accepts an array of ID_Tokens, an indication of the type of shared credentials used (credential_Type), and an indication of the type of hash algorithms used (hash_Type). In response, the find_Connections method returns an array of relationship pairs comprising two ID tokens and an indication of the relationship between the members represented by the two ID tokens.

The shared credential types include an e-mail address (credential_Type=1), first and last name (credential_Type=2), telephone number (credential_Type=3), and any other types or a combination of two or more types that might be used to identify an individual. Of the three types specifically identified here, the e-mail address type is preferred, because in most instances an e-mail address is associated with a single individual.

The hash algorithm types include none (hash_Type=0), MD5 one-way hash algorithm (hash_Type=1), and SHA-1 one-way hash algorithm (hash_Type=2). When hash_Type=1 or 2, the corresponding one-way hash algorithm is used to create a hash value from the identifying information associated with the credential type selected (e.g., e-mail, first and last name, telephone number, etc.), and the hash value is used as a shared credential. When hash_Type=0, a hash algorithm is not used and the shared credential comprises the identifying information associated with the credential type selected (e.g., e-mail, first and last name, telephone number, etc.).

In Step 420, after receiving the set of the ID tokens 405 from the third party application 610, the application server 200 compares the value of each ID token from the set against ID tokens corresponding to the members of the online social network. The ID tokens corresponding to the members of the online social network are generated using the shared credential type and the hash algorithm type specified in the variables credential_Type and hash_Type. A match from this comparison indicates that there is a record for that individual in both the third party database 620 and in the member database 210.

For some embodiments, the application server 200 may improve its processing efficiency by generating the ID tokens for its members ahead of time and having them stored for use in the comparison of Step 420. For example, the application server 200 may maintain an index of unique member identifiers, each associated with the corresponding member's e-mail address (credential_Type=1, hash_Type=0), a hash value generated from the corresponding member's e-mail address using the MD5 hash algorithm (credential_Type=1, hash_Type=1), and a hash value generated from the corresponding member's e-mail address using the SHA-1 hash algorithm (credential_Type=1, hash_Type=2).

At this point, the application server 200 has identified which ID_Tokens have a member profile in the online social network. In Step 430, the application server 200 queries the graph servers 300 to obtain the specific relationship information for the identified members. For example, referring to FIG. 4, for each member pair: (A, B), (A, E), (A, F), (B, E), (B, F), and (E, F), the application server 200 issues a query to the graph servers 300 to obtain the degree of separation between the member pair.

Then, in Step 440, the application server 200 returns an array 455, which includes the ID tokens corresponding to each member pair and the degree of separation obtained for each member pair, e.g., (A, B, 1), (A, E, 4), (A, F, 3), (B, E, 5), (B, F, 4), and (E, F, 1). Optionally, other attributes, e.g., demographic information, may be returned. Using the ID tokens that are returned, the third party application 610 identifies the corresponding members in the third party database 620, and records the degrees of separation between the member pairs.

Note, in the above example, the application server 200 returns a pair indicating a third degree relationship between A and F, but does not include the connecting members, C and D. Unless the set of ID tokens 405 includes a token for each member with a record in the online social network, the information returned by the application server 200 may be incomplete in some respects. In other words, when the relationship graph is reconstructed from the information returned by the application server 200, A and F will be connected to two dummy nodes.

In another embodiment of the invention, the third party application 610 may use a method from API 600 that requires the passing of a single ID token (e.g., corresponding to member M1), a shared credential type, a hash algorithm type, and a d/s setting N, in its request to the application server 200. In response, the application server 200 returns an indication of M1's social network up to N degrees of separation. The method signature is as follows:

network get_Network(ID_Token, credential_Type, hash_Type, N).

The d/s setting N is optional. If it is omitted, a default value, e.g., 3, is used. If it is specified, the application server 200 returns an indication of M1's social network up to the specified degree of separation.

After receiving the request according to the get_Network method, the application server 200 identifies the member corresponding to the ID token (e.g., M1) provided by the third party application 610. If the ID token does not correspond to any member, the application server returns an indication of this to the third party application 610. Otherwise, the application server 200 queries the graph servers 300 to identify the members of the online social network that are related to M1 within N degrees of separation (or a number specified in the get_Network method). For each member identified, the application server 200 creates an ID token in accordance with the shared credential type and the hash algorithm type specified in the request. The application server 200 returns all ID tokens so created along with an indication for each ID token the degree of separation from M1. The third party application 610 then uses the returned set of ID tokens to determine whether the third party database 620 contains records corresponding to the members in M1's social network, and if there are, it stores the degree of separation information for each such record.

As an example, the third party application 610 may be an online gaming site and the third party database 620 may be the database of registered users maintained by the online gaming site. The process described above would be used by the online gaming site to obtain social network information for its registered users from the computer system of FIG. 2, so that each time a registered user logs in to play, the online gaming site can invite (by e-mail or IM, for example) one or more additional registered users in his or her network to log on and play as well.

The present invention may also be used to clarify ambiguities in certain requests for information. For example, if a user queried an online telephone directory for the number of "John Smith," many results may be returned. The online telephone directory could use the get_Network API method to query the application server 200 to identify a John Smith present in the requestor's social network, likely eliminating all but one "John Smith" from consideration.

Figure 6:
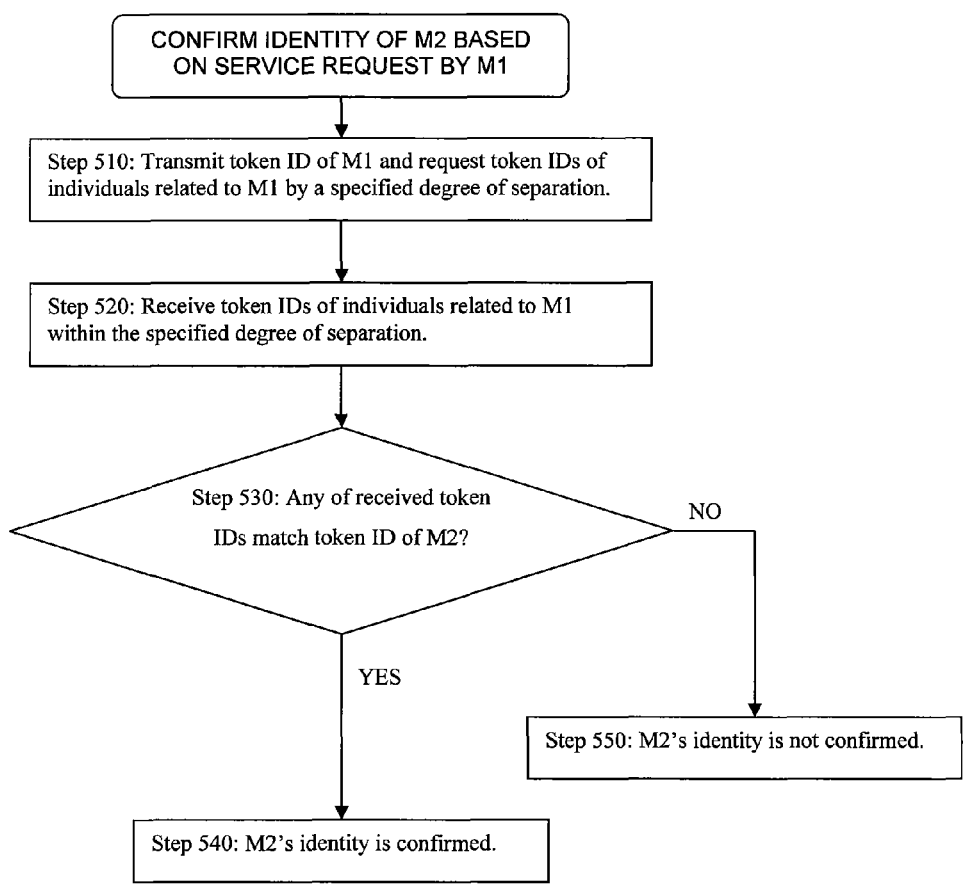
FIG. 6 is a flow diagram illustrating a method for using relationship information obtained from a social network.

FIG. 6 illustrates the above process in further detail. In Step 510, the ID token of the user requesting the number of "John Smith" (e.g., M1) is transmitted by the third party application 610 to the application server 200 along with the get_Network request which also specifies the shared credential type used, the hash algorithm type used, and the d/s setting N. The application server 200 then compares the ID token of the requesting user with the ID tokens of its members. If a match is found, the application server 200 queries the graph server 300 for all members related to the member corresponding to the matching ID token within N degrees of separation. The ID tokens of all such members are then transmitted to the third party application 610. The third party application 610 receives these ID tokens (Step 520) and compares them against the ID token of a "John Smith" candidate (Step 530). If there's a match, it is confirmed that the "John Smith" candidate is the "John Smith" that M1 is looking for (Step 540). If there is not a match, the "John Smith" candidate is not confirmed as the "John Smith" that M1 is looking for (Step 550), and the third party application 610 compares the received ID tokens against the ID token of another "John Smith" candidate. This process is repeated until a match is found or all "John Smith" candidates have been exhausted.

The application server 200 may be configured to provide the degree of separation between two individuals. A method signature from the API 600 call for this could be the following:

get_Degrees(ID_Token1, ID_Token2, credential_Type, hash_Type).

The application server 200 processes this call in a manner similar to the above calls. First, the application server 200 resolves which members in the member database 210 correspond to IDToken1 and ID_Token2. If the application server 200 is unable to resolve one or both an error is returned. Otherwise, the application server 200 queries the graph servers 300 to determine the degree of separation between the members corresponding to ID_Token1 and IDToken2. Once determined, the application server 200 returns a number as the degree of separation between the two members. Using the degree of separation between the two individuals, the third party application 610 may manage transaction processing based on the relationship (or lack thereof) between the two members.

The third party application 610 may use this information to control the visibility of information in the third party database 620. For example, the third party application 610 might store telephone numbers, or other personal information related to a user M1 in the third party database 620, and an access preference from M1 that specifies how closely related to M1 a user has to be (expressed in terms of degrees of separation) in order to view M1's phone number. Using the relationship information obtained from the online social network as described above, the third party application 610 may limit access to M1's information stored in the third party database 620 to only those users who are within N degrees of separation, where N is the degree of separation specified by M1 in the access preference.

In the above examples, as an alternative to the MD5 and SHA-1, Message Authentication Code (MAC) may be used as the hash algorithm. MAC is also a one-way hash algorithm but uses a secret key that the party maintaining social network information and the party requesting social network information through the API 600 would agree to in advance. The use of the key provides extra security.

FIG. 2 depicts the third party database 620 to be external to the computer system 100 of the online social network. In alternative embodiments of the invention, the operator of the online social network may act as an application service provider (ASP) that maintains the third party database 620, on behalf of the third party, within the computer system 100. In such a case, the online social network periodically maps the social network information maintained by its graph servers 300 onto the third party database 620, so that the social network information will be made available for use without the information flow that is illustrated in FIGS. 5 and 6.

Figure 7:
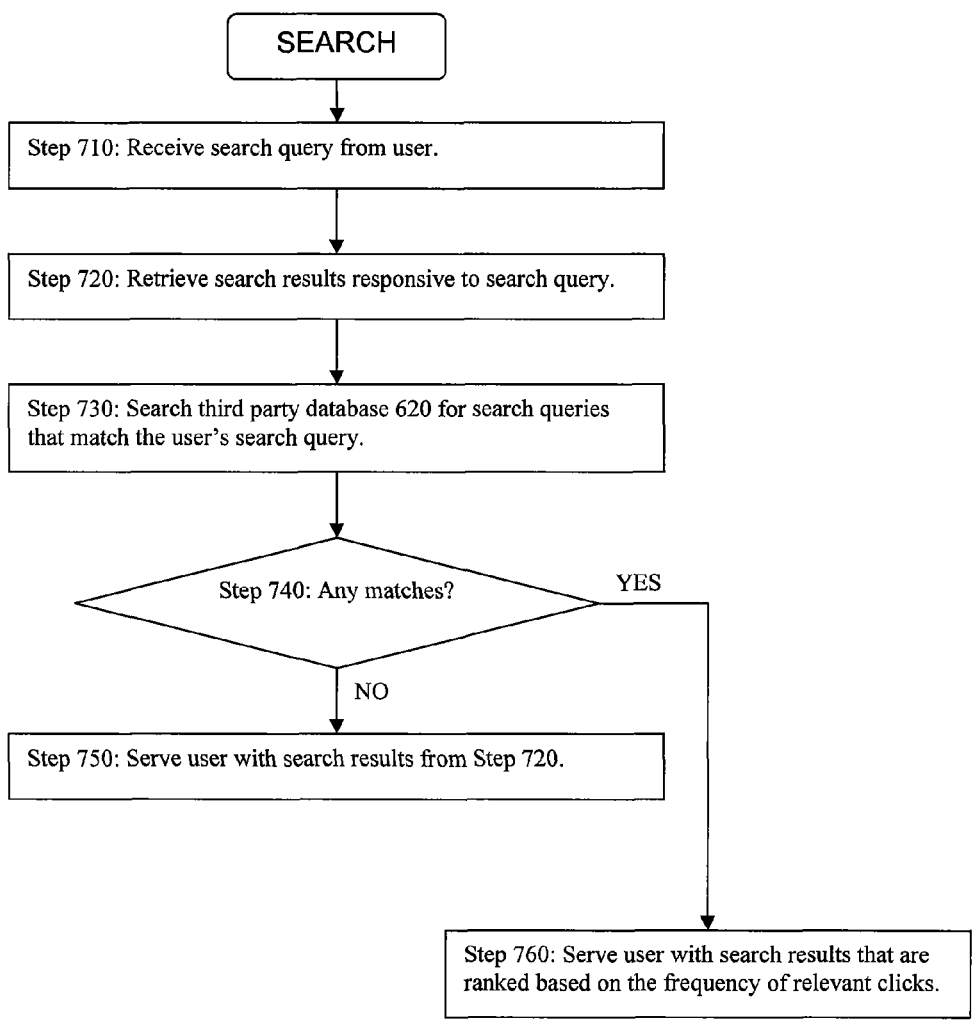
FIG. 7 is a flow diagram illustrating a method for carrying out a search request using relationship information obtained from a social network.
Figure 8:
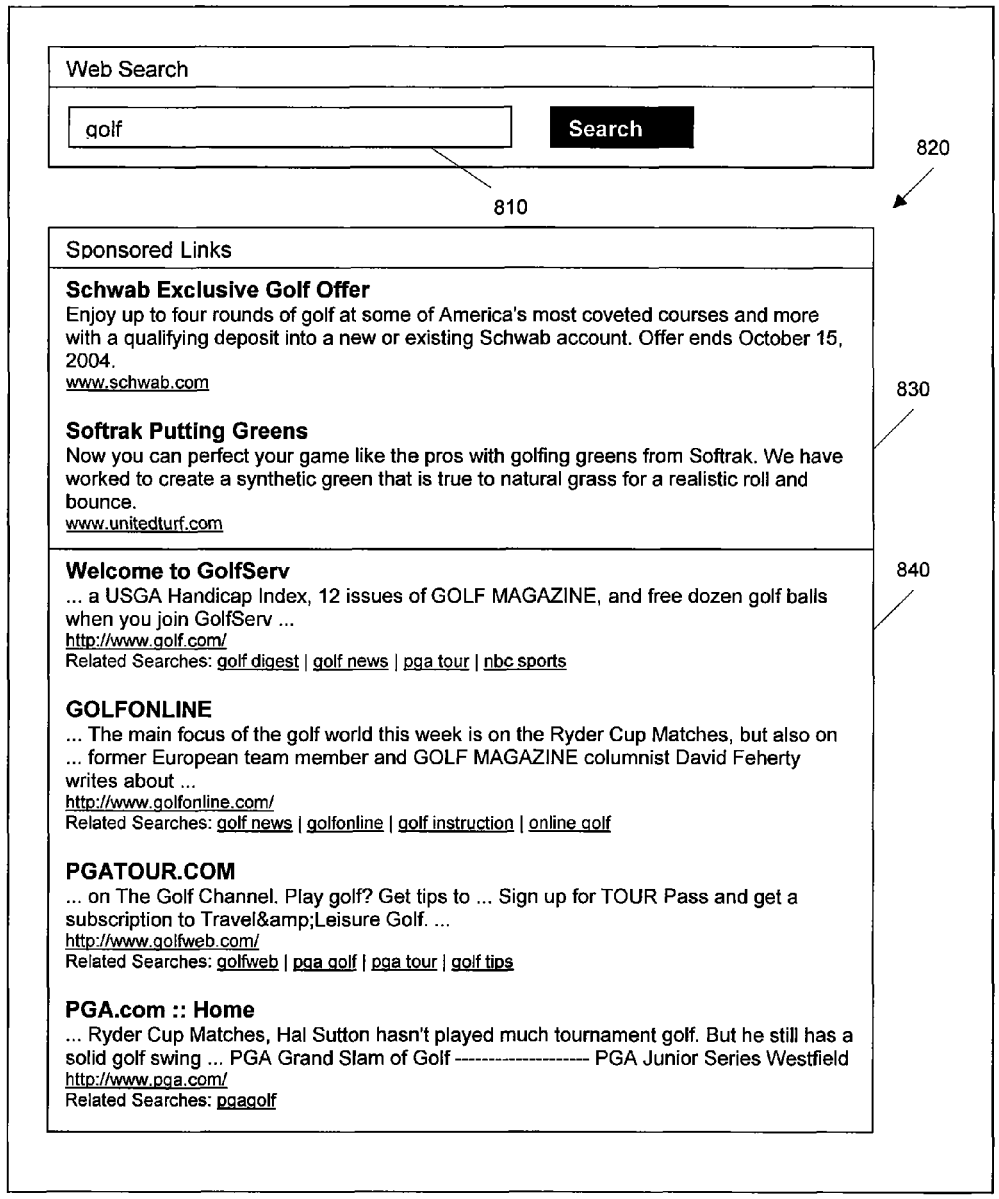
FIG. 8 is a sample query and search results generated using relationship information obtained from a social network.

FIG. 7 is a flow diagram illustrating the steps carried out by a search engine that uses social network information to tailor search results delivered to its users in response to a search query. A sample search query 810 and search results 820, which includes sponsored links (online ads) 830 and web search results 840, that are generated in response to the sample search query 810 is illustrated in FIG. 8.

The sponsored links 830 represent hyperlinks to web pages of advertisers who have agreed to pay the search engine operator for listing their hyperlinks on the search results page of users who submit search queries using certain keywords. In a typical arrangement, the advertisers bid on keywords such that higher bids result in higher placement on the search results page. The bids represent the amount the advertisers are willing to pay per click on their online ads. The web search results 840 represent what is commonly known in the art as algorithmic search results.

In this example, the third party application 610 is a search engine operator that manages a search results database, and the third party database 620 represents a plurality of databases including: (i) a user database that keeps track of all search queries specified by each user and, for each such search query, a record of all hyperlinks that the user clicked on when search results responsive to the search query were served to the user; (ii) a database containing information on advertisers, keywords that the advertisers bid on, and the sponsored links corresponding to the keywords; and (iii) a database of web pages that are used to generate the algorithmic search results.

In Step 710, the third party application 610 receives a search query from a registered user. In Step 720, the third party application 610 retrieves the search results (both sponsored links and algorithmic search results) responsive to the search query from its search results database. The retrieved sponsored links are ranked in accordance with the bids submitted by their advertisers, and the retrieved algorithmic search results are ranked based on their relevance as determined by the search engine. In Step 730, the third party application 610 searches the third party database 620 for search queries that match the one received from the user in Step 710. If there are no matches, the search results retrieved in Step 720 are served to the user (Steps 740 and 750).

If there are one or more matches, the algorithmic search results are re-ordered based on the frequency of "relevant" clicks on the hyperlinks associated with the search results and then served to the user. Frequency of clicks is equal to the number of prior clicks on a hyperlink divided by the number of times that hyperlink was displayed, and hyperlinks with higher frequencies are ranked higher than hyperlinks with lower frequencies. Relevant clicks are those clicks made by users who are within a specified degree of separation from the user who requested the search. The degree of separation information (i.e., social network or relationship information) may be maintained by the third party application 610 or obtained from an online social network in the manner described above in connection with FIG. 5. The specified degree of separation may be any number or set as ALL, in which case all clicks become relevant, and it may be set by the operator of the search engine, or it may be set by a user in his or her profile. For example, if the user sets the specified degree of separation as 1, only clicks made by those who are friends of the user become relevant clicks.

Figure 9:
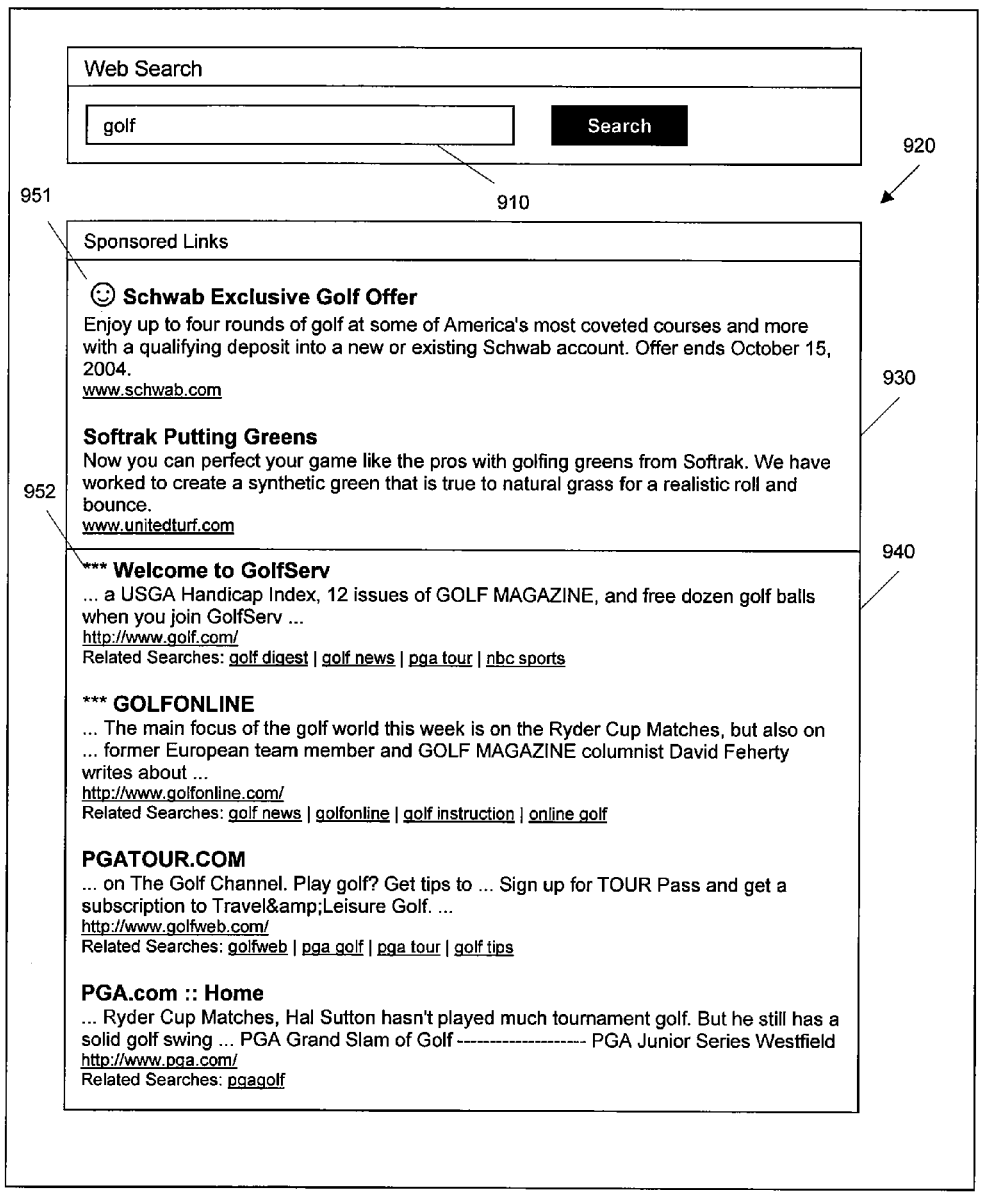
FIG. 9 is a sample query, search results, and relevance markers generated using relationship information obtained from a social network.

In addition, visual tags may be displayed on the search results page next to those search results (both sponsored links and algorithmic search results) for which relevant clicks have been recorded. FIG. 9 shows a sample search query 910 and search results 920, which includes sponsored links 930 and web search results 940, that are generated in response to the sample search query 910. Visual tags are displayed next to those search results for which relevant clicks have been recorded. Visual tags may be an image 951 or a text string 952. When the visual tag is an image, the source for the web page that displays the search results 920 specifies a pointer to a file that contains that image. When the visual tag is a text string, the source for the web page that displays the search results 920 includes the text string.

The computer system 100 of the online social network may also deliver Internet search results to members of the online social network and to Internet users who are not members of the online social network. In this example, the computer system 100 is provided with an Internet search results database and an Internet search query database that keeps track of all Internet search queries specified by each member of the online social network and, for each such search query, a record of all hyperlinks that the member clicked on when search results responsive to the search query were served to the member.

When the computer system 100 receives an Internet search query from one of its members, it retrieves the search results responsive to the search query from the Internet search results database, and searches the Internet search query database for search queries that match the one received from the member. If there are no matches, the search results retrieved from the Internet search results database are served to the member. If there is one or more matches, the search results retrieved from the Internet search results database are ranked based on the frequency of "relevant" clicks on the hyperlinks associated with the search results and then served to the member. Relevant clicks are those clicks made by members who are within a specified degree of separation from the member who requested the search. The specified degree of separation may be any number or set as ALL, in which case all clicks become relevant, and it may be set by the operator of the online social network, or it may be set by a member in his or her profile. For example, if the member sets the specified degree of separation as 1, only clicks made by those who are friends of the members become relevant clicks.

When the computer system 100 receives an Internet search query from an Internet user who is not a member of the online social network, it retrieves the search results responsive to the search query from the Internet search results database, and searches the Internet search query database for search queries that match the one received from the user. If there are no matches, the search results retrieved from the Internet search results database are served to the user. If there is one or more matches, the search results retrieved from the Internet search results database are ranked based on the frequency of clicks on the hyperlinks associated with the search results and then served to the user.

Figure 10:
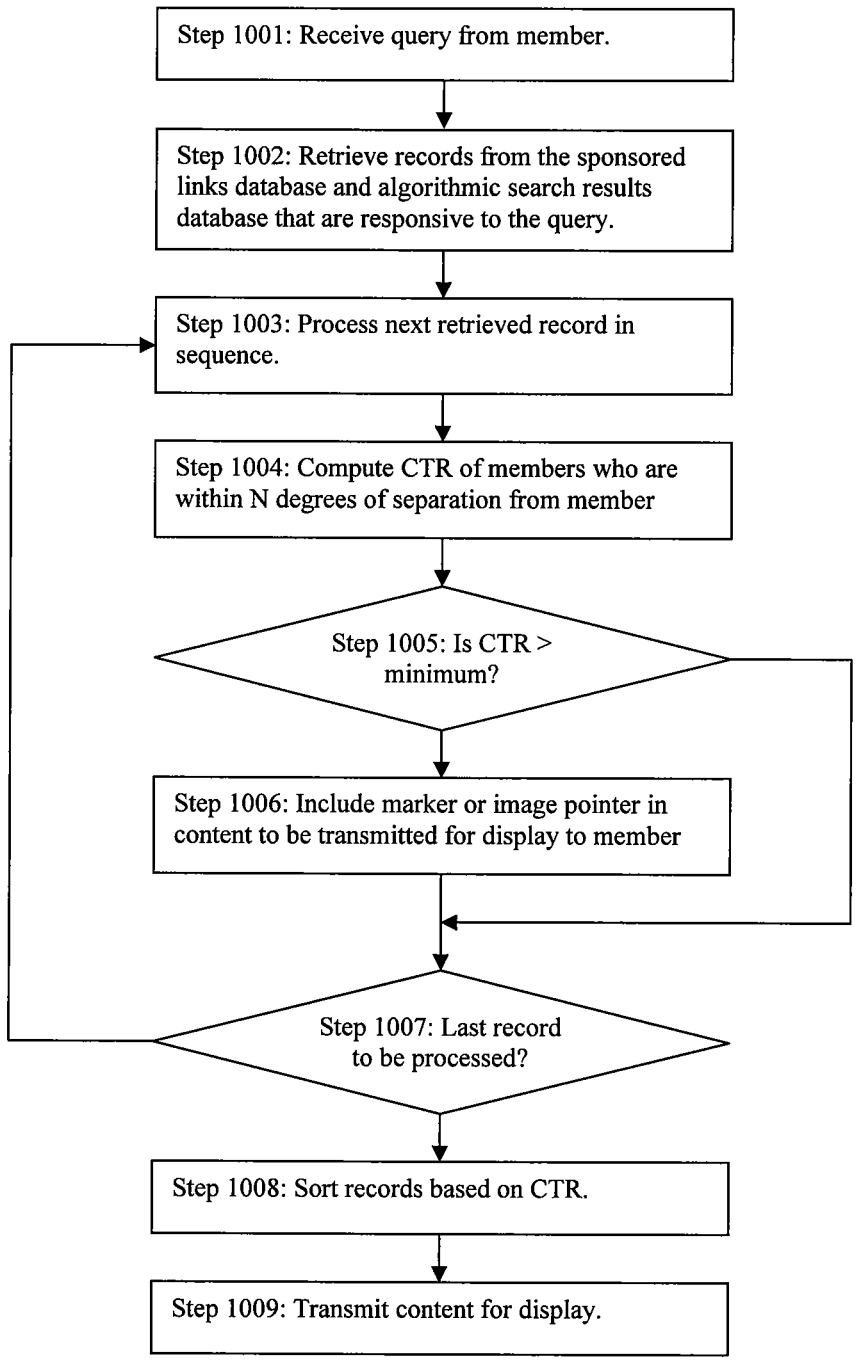
FIG. 10 is a flow diagram illustrating another method for carrying out a search request using relationship information obtained from a social network.

In a slightly different embodiment, the computer system 100 of the online social network delivers both sponsored links and algorithmic search results to members of the online social network. This process is illustrated in FIG. 10. In this example, the computer system 100 is provided with a search query database that keeps track of all Internet search queries specified by each member of the online social network and, for each such search query, a record of all hyperlinks that the member clicked on when search results responsive to the search query were served to the member. It also includes or is connected to: (i) a database containing information on advertisers, keywords that the advertisers bid on, and the sponsored links corresponding to the keywords; and (ii) a database of web pages that are used to generate the algorithmic search results.

In Step 1001, the computer system 100 receives an Internet search query from a member. In Step 1002, it retrieves records that are responsive to the search query from the sponsored links database and the algorithmic search results database, and searches the Internet search query database for search queries that match the one received from the member.

In Steps 1003-1007, it processes each of the retrieved records in sequence (Step 1003). In Step 1004, it computes the click-through rate (CTR) on that record by members of the social network who are within a specified degree of separation from the member, and in Step 1005, checks to see if the computed CTR is greater than a minimum value. The specified degree of separation may be any number or set as ALL, and it may be set by the operator of the search engine, or it may be set by a user in his or her profile. The minimum value may be zero or a small value (e.g., 0.01). If the computed CTR is greater than the minimum value, the computer system 100 determines the record to be "relevant" and specifies a marker to be displayed next to this record in the search results (Step 1006). Flow then proceeds to Step 1007 where it continues processing of the remaining records. If the computed CTR is less than or equal to the minimum value, flow proceeds to Step 1007 where it continues processing of the remaining records. After the last record has been processed, the records are sorted based on their computed CTR (Step 1008) and the content is transmitted for display.

While particular embodiments according to the invention have been illustrated and described above, those skilled in the art understand that the invention can take a variety of forms and embodiments within the scope of the appended claims.

What is claimed is:

1. A method comprising:
receiving, by one or more computing devices, a search query from a first user of a social-networking system, the social-networking system comprising a graph that comprises a plurality of nodes and edges connecting the nodes, at least one node in the graph corresponding to the first user;
identifying, by one or more computing devices, one or more web pages responsive to the search query, each web page being hosted by a third party application server that is external to the social-networking system;
retrieving, by one or more computing devices, information associated with the first user to identify one or more second users of the social-networking system, for each of the second users at least one node in the graph corresponding to the second user, at least one of the nodes corresponding to the first user and at least one of the nodes corresponding to a second user being connected to each other by one or more edges;
ranking, by one or more computing devices, the identified web pages that are hosted by third party application servers that are external to the social-networking system based at least in part on interaction of the second users of the social-networking system with the web pages, the interaction of the second users being determined, for each of the web pages, from one or more databases indicating a number of times the web page has been accessed by the second users divided by a number of times the web page has been presented to the second users; and
providing, by one or more computing devices, a link for each of the web pages for presentation to the first user as ranked.

2. The method of claim 1, further comprising associating, by the one or more computing devices, a visual indicator with each of the web pages for which the interaction satisfies a predetermined threshold each visual indicator when presented being presented in close proximity with the web page it is associated with.

3. The method of claim 2, wherein the visual indicator comprises a clickable icon or word.

4. The method of claim 1, wherein retrieving information associated with the first user comprises:
sending a request for the information comprising an identifier of the first user; and
receiving the information, the information comprising identifiers of the second users respectively.

5. The method of claim 1, wherein the one or more databases comprise at least a first, second and third databases, the method further comprising maintaining:

the first database of a plurality of search queries submitted by a plurality of users and, for each of the search queries, a list of web pages that have been presented to and accessed by one or more of the users in connection with the search query;

the second database of a plurality of advertisers, a plurality of keywords bid on by the plurality of advertisers, and a plurality of sponsored links corresponding to the plurality of keywords; and the third database of a plurality of algorithmic search results.

6. The method of claim 1:

wherein the web pages comprise one or more sponsored links and one or more algorithmic search results;

the method further comprising:

ranking the sponsored links further based at least in part on bids received with the sponsored links; and ranking the algorithmic search results further based at least in part on a degree of relevance of each algorithmic search result with respect to the search query.

7. A system comprising: a memory comprising instructions executable by one or more processors; and the one or more processors coupled to the memory and operable to execute the instructions, the one or more processors being operable when executing the instructions to:

receive a search query from a first user of a social-networking system, the social-networking system comprising a graph that comprises a plurality of nodes and edges connecting the nodes, at least one node in the graph corresponding to the first user;

identify one or more web pages responsive to the search query, each web page being hosted by a third party application server that is external to the social-networking system;

retrieve information associated with the first user to identify one or more second users of the social-networking system, for each of the second users at least one node in the graph corresponding to the second user, at least one of the nodes corresponding to the first user and at least one of the nodes corresponding to a second user being connected to each other by one or more edges;

rank the identified web pages that are hosted by third party application servers that are external to the social-networking system based at least in part on interaction of the second users of the social-networking system with the web pages, the interaction of the second users being determined, for each of the web pages, from one or more databases indicating a number of times the web page has been accessed by the second users divided by a number of times the web page has been presented to the second users; and provide a link for each of the web pages for presentation to the first user as ranked.

8. The system of claim 7, wherein the one or more processors are further operable when executing the instructions to associate a visual indicator with each of the web pages for which the interaction satisfies a predetermined threshold visual indicator when presented being presented in close proximity with the web page it is associated with.

9. The system of claim 8, wherein the visual indicator comprises a clickable icon or word.

10. The system of claim 7, wherein, to retrieve the information of the first user, the processors are operable when executed the software to:

send a request for the information comprising an identifier of the first user; and receive the information, the information comprising identifiers of the second users respectively.

11. The system of claim 7, wherein the one or more databases comprise at least a first, second and third databases, and wherein the processors are further operable when executing the instructions to maintain:

the first database of a plurality of search queries submitted by a plurality of users and, for each of the search queries, a list of web pages that have been presented to and accessed by one or more of the users in connection with the search query;

the second database of a plurality of advertisers, a plurality of keywords bid on by the plurality of advertisers, and a plurality of sponsored links corresponding to the plurality of keywords; and the third database of a plurality of algorithmic search results.

12. The system of claim 7:

wherein the web pages comprise one or more sponsored links and one or more algorithmic search results;

the one or more processors being further operable when executing the instructions to:

rank the sponsored links further based at least in part on a-bids received with sponsored links; and rank the algorithmic search results further based at least in part on a degree of relevance of each algorithmic search result with respect to the search query.

13. One or more computer-readable non-transitory storage media embodying software operable when executed by one or more computer systems to:

receive a search query from a first user of a social-networking system, the social-networking system comprising a graph that comprises a plurality of nodes and edges connecting the nodes, at least one node in the graph corresponding to the first user;

identify one or more web pages responsive to the search query, each web page being hosted by a third party application server that is external to the social-networking system;

retrieve information associated with the first user to identify one or more second users of the social-networking system, for each of the second users at least one node in the graph corresponding to the second user, at least one of the nodes corresponding to the first user and at least one of the nodes corresponding to a second user being connected to each other by one or more edges;

rank the identified web pages that are hosted by third party application servers that are external to the social-networking system based at least in part on interaction of the second users of the social-networking system with the web pages, the interaction of the second users being determined, for each of the web pages, from one or more databases indicating a number of times the web page has been accessed by the second users divided by a number of times the web page has been presented to the second users; and provide a link for each of the web pages for presentation to the first user as ranked.

14. The media of claim 13, wherein the software is further operable when executed by one or more computer systems to associate a visual indicator with each of the web pages for which the interaction satisfies a predetermined threshold visual indicator when presented being presented in close proximity with the web page it is associated with.

15. The media of claim 14, wherein the visual indicator comprises a clickable icon or word.

16. The media of claim 13, wherein, to retrieve the information of the first user, the software is operable when executed by one or more computer systems to:
- send a request for the information comprising an identifier of the first user; and
- receive the information, the information comprising identifiers of the second users respectively.

17. The method of claim 1, wherein the web pages are ranked based at least in part on frequency of clicks on the search results by the second users.

18. The method of claim 1, wherein the web pages are ranked based at least in part on click history of the web pages.

* * * * *